Figure 1:
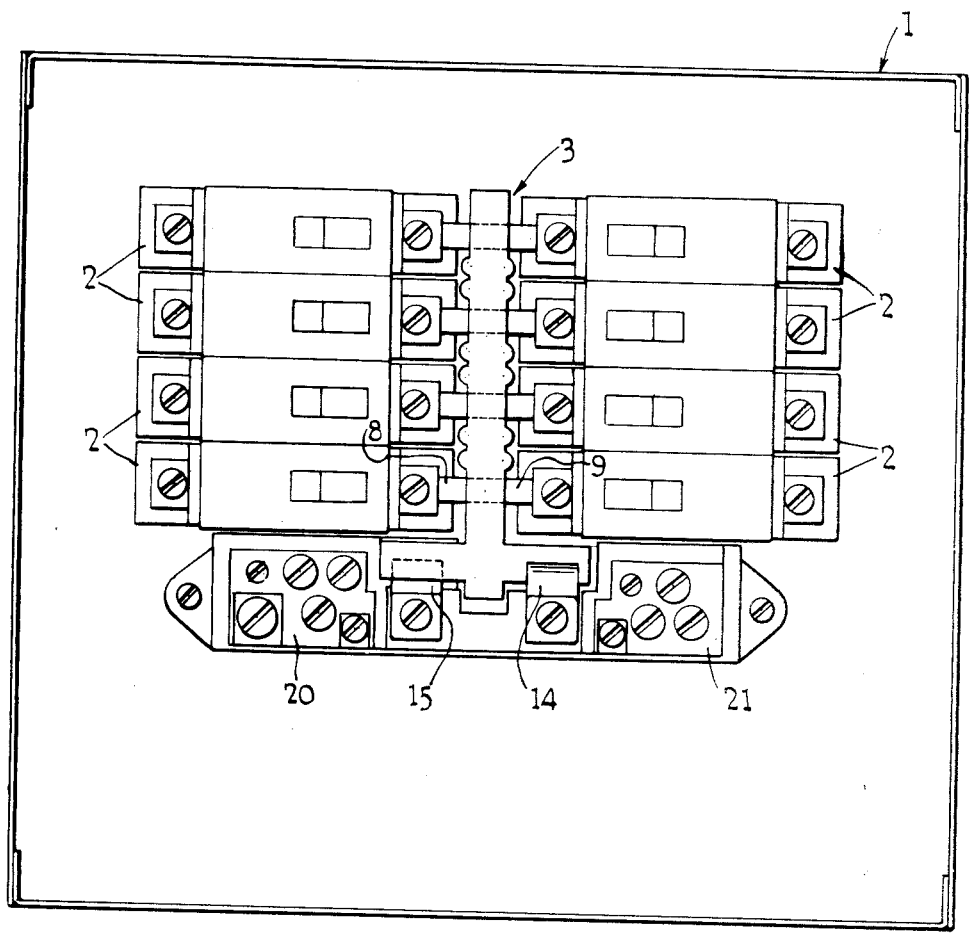

Aug. 12, 1952     A. B. RYPINSKI     2,606,957
PANEL BOARD

Filed Aug. 9, 1949     2 SHEETS—SHEET 1

INVENTOR.
ALBERT B. RYPINSKI
BY
George T. Gill
ATTORNEY

Aug. 12, 1952     A. B. RYPINSKI     2,606,957
PANEL BOARD
Filed Aug. 9, 1949                         2 SHEETS—SHEET 2
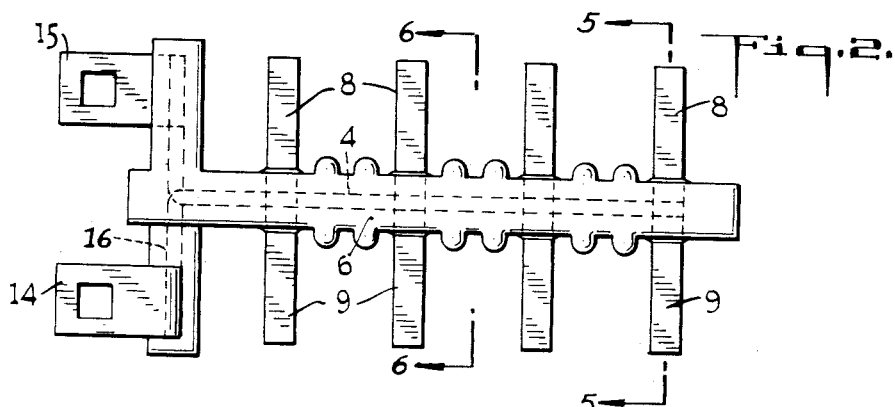
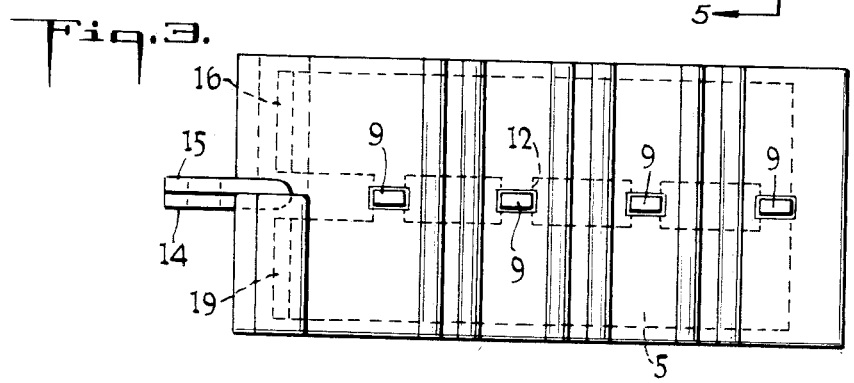
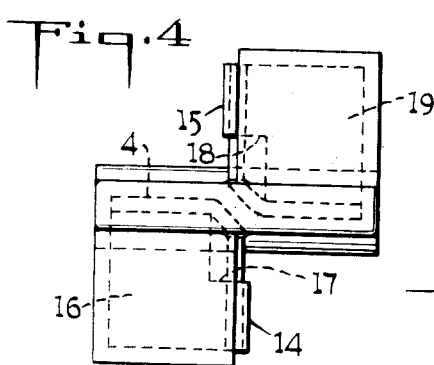
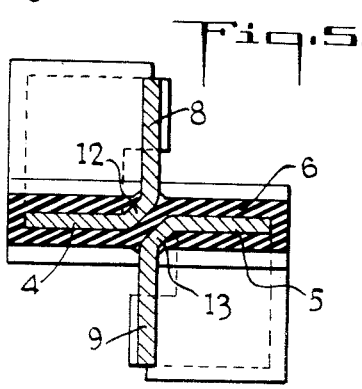
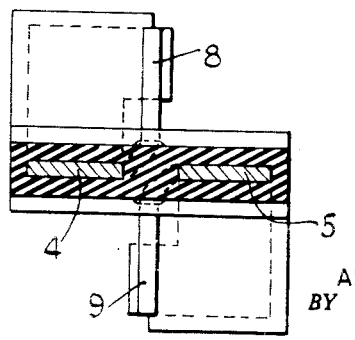
INVENTOR.
ALBERT B. RYPINSKI
BY
*George T. Gill*
ATTORNEY Patented Aug. 12, 1952

2,606,957

UNITED STATES PATENT OFFICE 2,606,957

PANEL BOARD

Albert B. Rypinski, Laurelton, N. Y., assignor to Murray Manufacturing Corporation, Brooklyn, N. Y., a corporation of New York Application August 9, 1949, Serial No. 109,320

2 Claims. (Cl. 175—308)

The invention herein disclosed relates to an electrical panel board that contains a plurality of circuit controlling devices. More particularly, the invention relates to a panel board of the kind mentioned that is especially suitable for circuits of nominal rated capacity, such, for example, as are used in homes, offices and factories.

An object of the invention is to provide a panel board of the kind mentioned that is comparatively compact in construction and that is comparatively less expensive to manufacture. Another object of the invention is to provide a simplified arrangement of busbars and the connection thereof to the circuit controlling devices.

The foregoing objects and certain advantages that will hereinafter appear are realized in the embodiment of the invention illustrated in the accompanying drawing and described in detail below, from which description a clearer understanding of the invention may be had.

The drawing includes:

Fig. 1 which is a plan view of a panel board embodying the invention within a metal box;

Fig. 2 which is a plan of the busbar arrangement shown in the panel board illustrated in Fig. 1;

Fig. 3 which is a side elevation of the same;

Fig. 4 which is an end elevation of the same, taken at the left hand end;

Fig. 5 which is a transverse section of the same, taken on the line 5—5 of Fig. 3; and, Fig. 6 which is also a transverse section of the same taken on the line 6—6 of Fig. 3.

In general, the panel board of this invention includes a supporting member or box 1 to which a plurality of circuit controlling devices 2 are secured, and a special busbar arrangement 3 through which the circuit controlling devices are connected to the supply line. The circuit controlling devices illustrated are circuit breakers of nominal rated capacity such as are used in homes, offices etc. However, other circuit controlling devices such, for example, as switches or fuse blocks may be secured to the supporting member. The circuit controlling devices 2, in the illustrated panel board, are arranged in two spaced rows with the devices in each row being in side by side relation. The busbar arrangement 3 is positioned between the two rows of circuit breakers.

The busbar arrangement 3, shown in Figs. 1 to 6 of the drawings, consists of two like busbars 4 and 5 encased as a unit in a homogeneous coating of electrical insulating material 6. The busbars 4 and 5 each consists of a flat strip of electrically conductive material such, for example, as copper. They are arranged vertically in a common plane and spaced from each other. At spaced intervals, spaced in accordance with the spacing of the terminals, such as the terminals 7, of successive circuit controlling devices 2 of the panel board, connecting tangs extend laterally from the busbars. In the particular panel board shown four connecting tangs 8 extend from the busbar 4, and four connecting tangs 9 extend from the busbar 5 in a direction opposite to the tangs 8. The tangs 8 are connected to the circuit controllers on one side of the panel by terminal screws 10, and the tangs 9 are connected by terminal screws 11 to the circuit controllers on the other side of the panel board, the busbar arrangement 3 extending between the two rows of circuit breakers 2.

Each tang 8 extends from the lower edge of the busbar 4 for a short portion 12, at an angle of forty-five degrees to the plane of the busbar and then laterally of the plane of the busbar. In like manner, each tang 9 extends from the upper edge of the busbar 5 for a short portion 13 at an angle of forty-five degrees, and then laterally of the plane of the busbar. Thus the tangs 8 and 9 extend laterally in opposite directions and in alignment and are separated, between the portions 12 and 13 by the insulating material therebetween and through which the tangs extend. The ends of the tangs may be either straight as shown or bifurcated.

At one end, the left end as seen in Figs. 2 and 3, the busbar arrangement is provided with main line connectors 14 and 15 for the busbars 4 and 5 respectively. These line connectors 14 and 15 are in a common plane with the tangs 8 and 9. To form the line connector 14, the busbar 4 is bent to form a lateral portion 16 from the lower edge of which an extension 17 extends through the insulating covering and is bent at right angles to form the connector 14. The connector 15 extends at right angles from an extension 18 extending from the upper edge of a lateral portion 19 of the busbar 5.

The panel board is provided with a pair of neutral terminal blocks 20 and 21 that are connected together and to the ground. These are arranged adjacent the line connectors of the busbar, one on each side thereof.

The busbars are, as stated, encased in a homogeneous coating of insulating material, and the busbars are separated and insulated from each other by this homogeneous coating of insulating material. Thus, the spacing between the busbars and other parts carrying current may be materially and substantially reduced. In accordance with the standards of the National Board of Fire Underwriters, busbars laid on the same flat surface must be separated at least three quarters of an inch for one hundred and twenty-five volt circuits and one and one quarter inches for two hundred and fifty volt circuits. With the arrangement illustrated and described, wherein the busbars are encased in a homogeneous coating of insulating material, as, for example, where an insulating thermo-setting plastic is molded about the busbars, a spacing of one eighth of an inch or less between the parts is permissible.

In the panel board illustrated, the busbars are electrically and mechanically connected to the circuit controlling devices through the tangs 8 and 9 which are secured to the terminals thereof by the terminal screws 10 and 11. It is through the fastening of the tangs to the terminals, by the terminal screws 10 and 11 that the busbar arrangement 3 is supported on the panel board. Thus, a compact and comparatively inexpensive arrangement, having the advantages mentioned, is attained.

In the arrangement above described, adjacent circuit breakers are of the same polarity. There are, however, certain circumstances where it is desirable that adjacent circuit breakers be of opposite polarity. Where, for example, there is an electric range supplied through a load center or panel board, the Fire Underwriters require that both of the ungrounded lines must pass through circuit controlling devices, and where circuit breakers protect the range circuit, the two circuit breakers protecting the circuit must be simultaneously operable, that is when one is opened both must be opened. Where the circuit breakers are adjacent, simultaneous operation is readily effected.

From the foregoing description of the embodiment of the invention illustrated in the drawing, it will be apparent to those skilled in the art that by this invention there is provided an electrical panel board that is compact and that is comparatively inexpensive to manufacture, a panel board in which the busbars are compactly arranged, in which various circuit arrangements may be attained by substituting one busbar unit for another, and in which the busbar is supported by the circuit controlling devices. Three phase panel boards employing three buses may be constructed, employing one or more of the general arrangements shown. Since tangs may be brought out from any bus wherever desired, it becomes possible to bring out three phase branches wherever desired, or to exactly balance the single phase load on a three phase panel by proper arrangement of the tangs.

I claim:

1. An electrical panel board of the kind described comprising a supporting member, a plurality of circuit controlling devices secured to the supporting member in side by side relation, each circuit controlling device having a terminal connector, and a busbar unit for supplying current to the circuit controlling devices including two busbars arranged in the same plane with the adjacent edges thereof separated and encased as a unit in a homogeneous coating of insulating material, the insulating material being solid, extending between, insulating and maintaining the separation of the adjacent edges of the busbars and mechanically maintaining the busbars in assembled relation, and spaced tangs integral with the busbars extending through the insulating coating laterally of the plane of the busbars, lying in a substantially common plane and secured to the terminal connectors of the circuit controlling devices, the circuit controlling devices mechanically supporting the busbar unit.

2. An electrical panel board of the kind described comprising a supporting member, a plurality of circuit controlling devices secured to the supporting member in side by side relation, each circuit controlling device having a terminal connector, and a busbar unit for supplying current to the circuit controlling devices including two busbars arranged in the same plane with the adjacent edges thereof separated and encased as a unit in a homogeneous coating of insulating material, the insulating material being solid, extending between, insulating and maintaining the separation of the adjacent edges of the busbars and mechanically maintaining the busbars in assembled relation, and spaced tangs integral with the busbars extending from the adjacent edges of the busbars at an angle to the plane of the busbars and then laterally of the plane of the busbars through the enclosing coating, whereby the tangs lie in a common plane, the tangs being secured to the terminal connectors of the circuit controlling devices and the busbar unit being mechanically supported by the circuit controlling devices, and an integral main line connector extending from one end of each busbar through the insulating coating, the main line connectors being spaced apart and extending perpendicular to the plane of the busbars.

ALBERT B. RYPINSKI.

REFERENCES CITED

The following references are of record in the file of this patent:

UNITED STATES PATENTS

| Number | Name | Date |
|---|---|---|
| Re. 19,387 | Jennings | Mar. 10, 1936 |
| 303,735 | Jackson | Aug. 19, 1884 |
| 782,391 | Hanson | Feb. 14, 1905 |
| 1,028,259 | Murray | June 4, 1912 |
| 1,691,422 | Aalborg | Nov. 13, 1928 |
| 1,999,137 | Flewelling | Apr. 23, 1935 |
| 2,007,174 | Benjamin | July 9, 1935 |